United States Patent

Cooke et al.

[15] 3,659,205

[45] Apr. 25, 1972

[54] VARACTOR TUNED MICROSTRIP TUNER

[72] Inventors: Harry F. Cooke; Roger L. Weber; Donald B. Hall, all of Richardson; Darrell W. Whitten, Dallas, all of Tex.

[73] Assignee: Texas Instruments Incorporated, Dallas, Tex.

[22] Filed: Dec. 17, 1970

[21] Appl. No.: 99,297

Related U.S. Application Data

[63] Continuation of Ser. No. 679,063, Oct. 30, 1967, abandoned.

[52] U.S. Cl. ..........................325/445, 317/101 C, 325/458, 325/462

[51] Int. Cl. ..........................H04b 1/28

[58] Field of Search..................325/430, 436, 438, 439, 442, 325/445, 446, 451, 458, 462; 333/26; 343/859; 317/101 A, 101 C

[56] References Cited

UNITED STATES PATENTS

| | | | |
|---|---|---|---|
| 3,571,722 | 3/1971 | Vendelin | 325/445 |
| 3,550,043 | 12/1970 | Brooks | 333/26 |

*Primary Examiner*—Robert L. Griffin
*Assistant Examiner*—Kenneth W. Weinstein
*Attorney*—Samuel M. Mims, Jr., James O. Dixon, Andrew M. Hassell, Harold Levine, Melvin Sharp, John E. Vandigriff and James C. Fails

[57] ABSTRACT

Disclosed is a microstrip TV Tuner which is electronically tuned and the film portions of the tuner are photographically delineated on an insulating substrate.

5 Claims, 7 Drawing Figures

INVENTORS
HARRY F. COOKE
ROGER L. WEBER
DONALD B. HALL
DARRELL W. WHITTEN

BY
John E. Vandigriff
ATTORNEY

VARACTOR TUNED MICROSTRIP TUNER

This application is a continuation of Ser. No. 679,063, filed on Oct. 30, 1967, now abandoned.

This application relates to transmission line circuits and more particularly to a microstrip varactor-tuned UHF Tuner constructed on an insulating substrate.

Present day UHF TV Tuner design is not suitable for automatic assembly and is cost limited by the amount of labor involved in the assembly operation. The trend is towards designing smaller solid-state circuitry.

Prior to this invention, solid-state transmission-line circuits capable of providing adequate selectivity and noise figure for commercial UHF applications have not been built.

It is, therefore, one object of the present invention to provide electronically tuned UHF circuitry capable of acceptable performance throughout the UHF TV band.

It is another object of this invention to provide a microstrip tuner design suitable for automatic assembly.

One feature of this invention is a tuner using varactor-tuned lines for receiving UHF frequencies.

Other objects and features of the invention will be apparent from the following detailed description taken in conjunction with the appended claims and attached drawings in which:

Figures 1, 2:
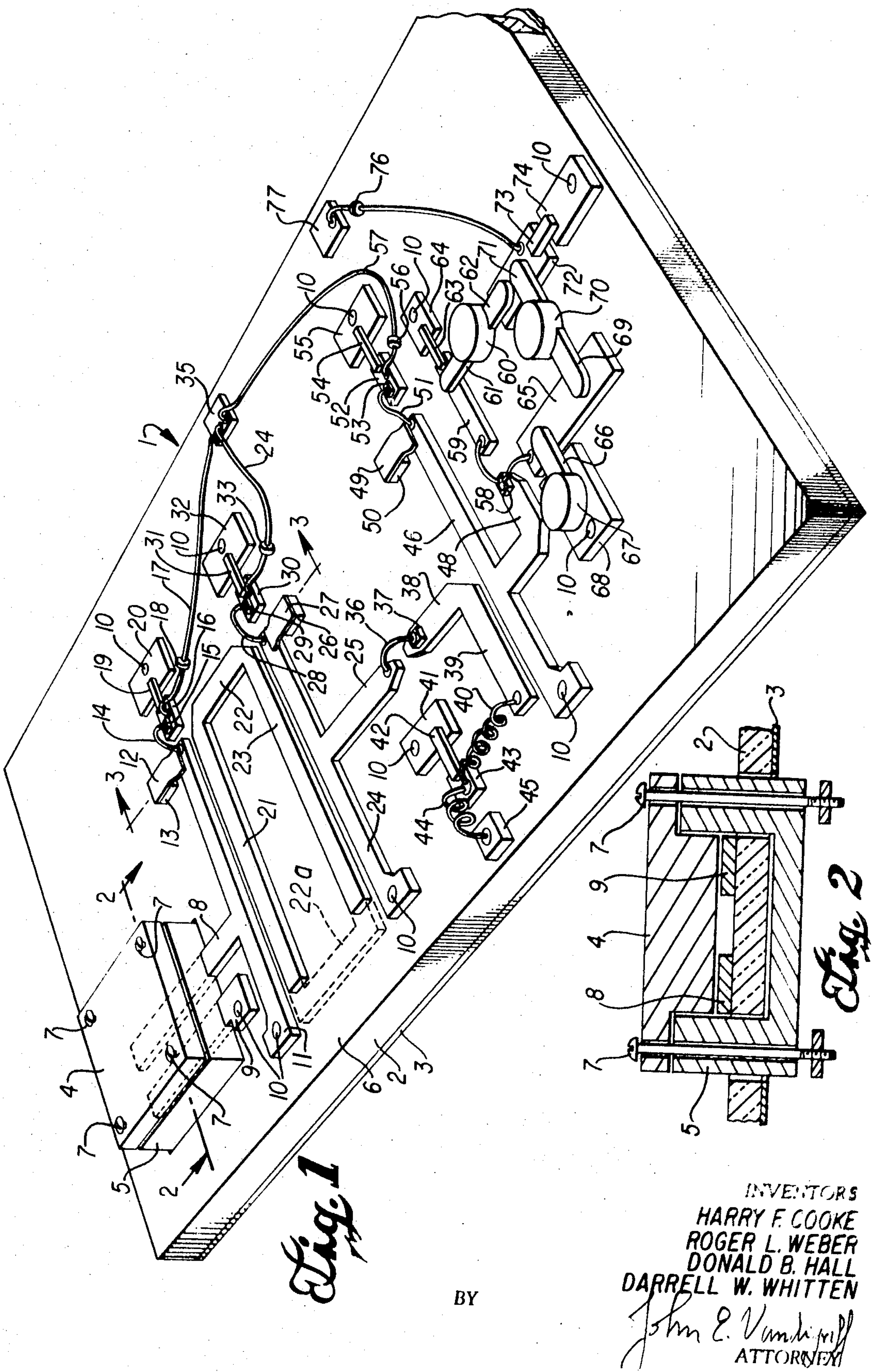
FIG. 1 is a pictorial view of a UHF Tuner using electrically tuned lines for tuning.
FIG. 2 is a cross section which shows the construction of a Balun input circuit to the tuner.

Referring now to the drawings, there is shown in FIG. 1 a pictorial representation of a microstrip UHF Tuner. The tuner is constructed on an insulating base 2 which has a metallic ground plane 3 on the underside thereof. The microstrip circuitry is in the form of thin metal films on top of the insulating surface 2.

The input to the tuner is through a Balun circuit, the construction of which is shown in FIG. 2. Two conductors, 8 and 9, are formed parallel to each other on the surface of the substrate. These conductors are enclosed within a ferrite core comprised of two parts, 4 and 5, part 4 residing on top of the conductors 8 and 9 and part 5 inserted from the bottom extending up through the substrate, and attached to the top part 4 by non-magnetic screws 7. Conductor 9 has a direct-current shorting stub 10 extending through the substrate and interconnected with the ground plane 3. Conductor 8 interconnects with conductor 11 at a point calculated to yield acceptable impedance transformation across the UHF spectrum. Conductor 11 is a tuned line which is a critical part of the preselector circuitry.

Figure 5:
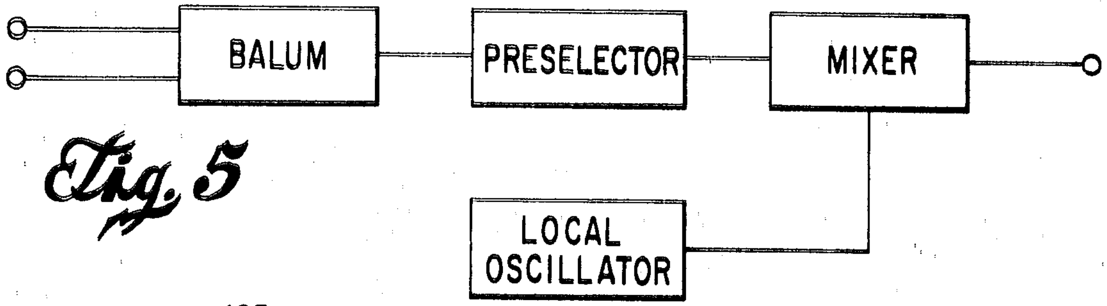
FIG. 5 is a block diagram showing the basic lay-out of the tuner.

The tuner comprises four basic sections, the Balun, the preselector, the mixer and the local oscillator, as shown in the block diagram, FIG. 5. The preselector is made up of two tuned lines, these lines being conductors 11 and 24. These two conductors are coupled together by a coupling link made up of conductors 21, 22 and 23.

Alternately an additional conductor 22*a* may be included to provide a closed loop circuit for the coupling circuit. The conductor 22*a* is shown in dotted lines in FIG. 1. In practice it has been found that the closed loop circuit is more efficient than the open coupling circuit.

Circuits have been constructed without a coupling circuit. Conductors 11 and 24 have been placed adjacent to each other so there is direct coupling between the two. Many coupling schemes are possible; the above three are given only by way of example.

The first tuned circuit includes conductor 11 which has a shorting stub 10 on one end extending through the substrate and interconnecting with the ground plane. On the other end is attached a trimmer capacitor 13 which is interconnected with the tuned line by strip 12. The tuning element is varactor diode 15 which is mounted upon conductor 16, one end of the varactor diode being in direct electrical contact with the conductor 16 and the other end connected to the line 11 by wire 14. Conductor 16 is also connected to terminal 20 by bypass capacitor 19. Terminal 20 is interconnected with the ground plane through the shorting stub 10. Varactor 14 is tuned by applying a potential thereto by wire 17 which is interconnected with terminal 35 to which a voltage is applied. Conductor 17 passes through a ferrite bead 18 which in conjunction with wire 17 forms a low-pass filter preventing radio frequency energy from reaching terminal 35. As mentioned, tuned line 11 is coupled with tuned line 24 by conductors 21, 22 and 23. These conductors provide both inductive and capacitive coupling from one tuned line to the other. Tuned line 24 is shorted to the ground plane by shorting stub 10 on one end and interconnected with varactor 29 by wire 28 on the other end. Trimmer capacitor 26 is interconnected also to the tuned line by conductor 27. Terminal 30 is bypassed by capacitor 31 to the terminal 32 which is connected to the ground plane by shorting stub 10. Power to varactor 29 is supplied through wire 24 which is connected to terminal 35. Conductor 24 also passes through a ferrite bead 33 for the same reason that conductor 17 passes through ferrite bead 18. The tuned lines 11 and 24 form the tuning circuits for the preselector.

The signal is taken from the preselector through a tap 25 on line 24 and interconnected by wire 36 to mixer diode 37. Mixer diode 37 is mounted on conductor 38 which has a portion thereof extending downwardly, which is designated 39. Energy is coupled to conductor 39 from the tuned line 46 which forms a portion of the resonant circuit for the local oscillator circuit. Line 46 is shorted to the ground plane through shorting stub 10 on one end and interconnected with varactor diode 53 on the other end by wire 51. Trimmer capacitor 50 is interconnected with the tuning line by conductor 49. Bypass capacitor 54 provides an alternating current path to ground through terminal 55 and shorting stub 10. Tuning voltage is applied through varactor 53 by wire 57 which extends through ferrite bead 56.

Transistor 54 is the active element in the oscillator circuit and is mounted on conductor 48 which forms a tap on tuned line 46. Bias is supplied to transistor 58 as follows: The emitter of transistor 58 is connected to conducting strip 59 which forms an inductance. The lower end of 59 is bypassed to ground by capacitor 53 mounted between the conductor strip 59 and terminal 64 which is grounded to ground plane by shorting stub 10. Also connected to the conductor 59 is resistor 60 which is connected thereto by lead 61. The resistor 60 is also connected to terminal 72 by lead 62. Terminal 72 is interconnected with terminal 77 by wire 75 which extends through ferrite bead 76 for the same basic reason that conductor 17 passes through ferrite bead 18. Terminal 72 is bypassed by capacitor 73 which is mounted between terminal 72 and terminal 74 which is shorted to the ground plane by shorting stub 10.

Bias is provided to the base of transistor 58 by resistors 67 and 70. Resistor 67 is mounted upon the terminal 68 and is connected to the ground plane by shorting stub 10 and connected to conductor 65 by lead 66. Voltage is applied to the base through resistor 70 which is connected between conductor 65 and 72 by lead wires 69 and 71.

Output from the oscillator is coupled into the mixer through the coupling between tuned line 46 and conductor 39, and is mixed with the signal from the preselector. The resulting intermediate frequency signal is taken out through terminal 45. Coils 40 and 44 in conjunction with bypass capacitor 42 form a low-pass circuit passing only the intermediate frequency. Coil 44 is mounted between terminals 43 and 45, and coil 40 is mounted between conductor 39 and terminal 43. Bypass capacitor 42 is mounted between terminal 43 and ground terminal 41 which is interconnected with the ground plane through shorting stub 10.

Operation of the circuit is as follows: An antenna is interconnected to the Balun introducing a UHF signal. Lines 11 and 24 in conjunction with varactors 15 and 29 respectively tune to the frequency of the incoming signal. The signal is then coupled into mixing diode 37 and mixed with the signal coupled from the oscillator. The intermediate frequency (I–F) signal which is the difference of incoming signal and the oscillating signal is then coupled to the output of the tuner.

By applying a voltage simultaneously to varactors 15, 29 and 53, tuned lines 11, 24 and 46 are so tuned that the difference between the resonant frequency of tuned lines 11 and 24 and the frequency of tuned line 46 is a fixed frequency, which may be, for example, 44 megacycles, a frequency commonly used in TV receivers. The tuning is accomplished by varying the voltage on the terminal 35, thereby varying the voltage applied to the tuning varactors.

Figure 3:
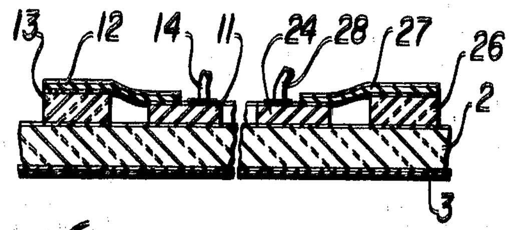
FIG. 3 is a cross section of a portion of a tuned line showing trimmer capacitors interconnected therewith.
Figures 4A, 4B:
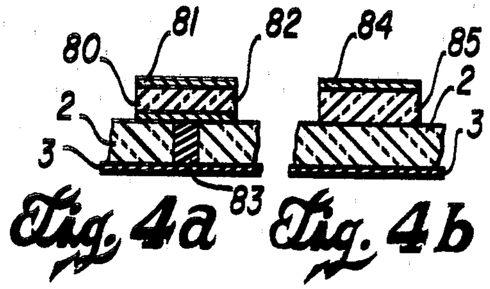
FIGS. 4A and 4B are cross sections of two different constructions used for the trimmer capacitors.

In FIG. 3 a cross sectional view of a portion of the tuned lines 11 and 24 is shown with trimmer capacitors 13 and 26 connected thereto. Capacitor 13 is connected to line 11 by conductor 12 and capacitor 26 is connected to line 24 by conductor 27. Capacitors 13 and 26 may be one of two types, as illustrated in FIGS. 4A and 4B. In FIG. 4A is shown a capacitor having a dielectric 80 and electrodes 81 and 82 on each side thereof. In this capacitor, the electrode 82 of the capacitor is interconnected with the ground plane by shorting stub 83. In this manner, the capacitor may be formed independent of the circuit and then mounted thereon.

The capacitor shown in FIG. 4B is integral with the substrate of the tuner. Dielectric material 85 is mounted on the substrate 2, one electrode of the capacitor being 84 and the other electrode being the ground plane 3. Both type capacitors as shown in 4A and 4B may be used in order to obtain the desired capacitance. Tuning of the capacitance may be accomplished by air-abrading the capacitor to remove portions thereof, thereby changing the value of the capacitance.

Figure 6:
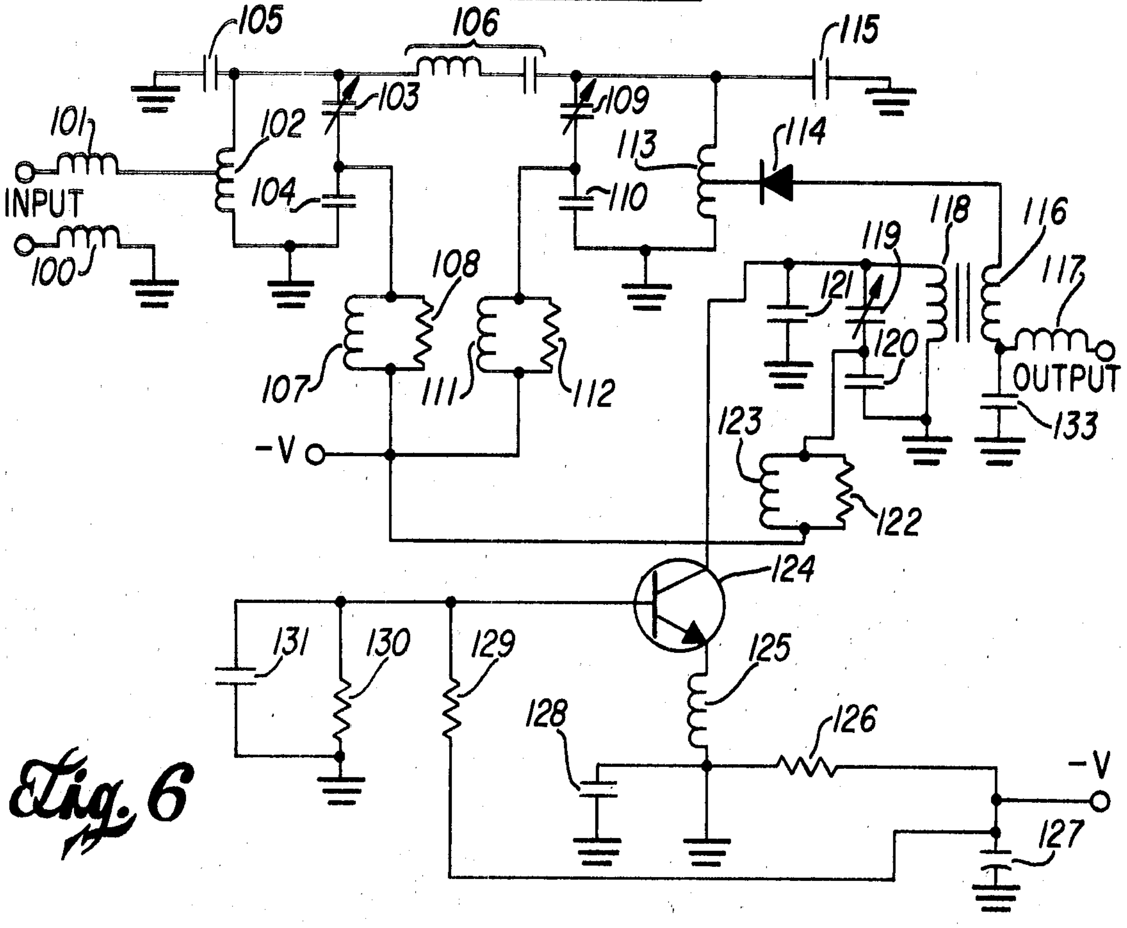
FIG. 6 is an approximate equivalent circuit diagram of the UHF Tuner shown and illustrated in FIG. 1.

Although it is not possible to show exact equivalents of the distributed capacitive and inductive values represented by the microstrips in the circuit shown in FIG. 1, they may be approximated, and an approximate circuit of the tuner is illustrated in FIG. 6. The input to the tuner is shown with coils 100 and 101 interconnected with coil 102 to form the input circuit and the first tuning circuit. Coil 102 is approximately equivalent to the line 11 with capacitor 103 being equivalent to the varactor diode 15 and capacitor 104 being bypass capacitor 19. Capacitor 105 is trimmer capacitor 13. The resistor-inductor combination 107 and 108 is approximately equivalent to lead wire 17 and ferrite bead 18.

An exact representation of the coupling lines 21, 22 and 23 is not readily ascertainable, however, since these lines represent both inductive and capacitive coupling, it has been represented by the capacitor-inductor circuit combination 106.

The second tuned line is approximately the same as the first tuned line. Coil 113 and capacitors 109, 110 and 115 are being essentially equivalent to corresponding components in the first tuned circuit. Diode 114 is the mixer diode. The oscillator circuit is shown with coil 118 representing tuned line 46, capacitor 119 representing varactor 53 and capacitors 120 and 121 representing capacitors 54 and 50 respectively. Conductor 123 and resistor 122 represent lead wire 57 and ferrite bead 56. Resistors 126, 129 and 130 correspond to resistors 60, 70 and 67 respectively. Conductor 125 is conducting strip 59 and bypass capacitors 127, 128 and 130 are capacitors 73, 63 and the bypass from the lead 67 to ground of resistor 67 respectively.

The output circuitry coils 116 and 117 and bypass capacitor 133 represent the conductor 39, coils 40, 44, and bypass capacitor 42.

The substrate 2 may be any suitable high frequency material such as alumina, barium titanate or magnesium-titanium oxide. The high dielectric constant of some of these materials makes this suitable for use at UHF frequencies and permits the reduction of the physical size requirement of the microstrip lines. The basic conductive regions on the substrate such as the tuned lines, conducting strips and terminals may be photographically delineated in the same manner that copper printed circuits are formed on substrates. The few discrete components such as diodes, transistors and resistors may be mounted at the appropriate places on the metal film conductors.

Other circuits such as high frequency amplifiers, intermediate frequency amplifiers and VHF—UHF radio circuits may be made by this same method and the invention hereof is not limited to UHF tuner circuits.

Although the present invention has been shown and illustrated in terms of a specific preferred embodiment, it will be apparent that changes and modifications are possible without departing from the spirit and scope of the invention as defined in the appended claims.

What is claimed is:

1. A microstrip frequency converter of the type having a Balun input circuit, a microstrip preselector circuit, a microstrip tunable oscillator circuit, and a microstrip mixer circuit overlying and secured to a first major surface of an insulating substrate, and a ground plane secured to a second major surface of said substrate, comprising in combination:

a. an insulating substrate having an electrically conductive layer selectively overlying and secured to a first major surface thereof to form a ground plane for said frequency converter;

b. a Balun input circuit having 1. first and second spaced microstrip members overlying in non-intersecting relationship and secured to a second major surface of said substrate, said first microstrip member having one of its ends electrically connected to said ground plane;
2. a first ferrite member overlying and secured to said one major surface of said substrate below said first and second microstrip members; and
3. a second ferrite member overlying and secured to said second major surface of said substrate above said first and second microstrip members;

c. a microstrip preselector circuit having first and second substantially T-shaped microstrip members in which the horizontal portions thereof are in spaced parallel relationship, a first end of each of said horizontal portions being connected to said ground plane and a second end of each of said horizontal portions being respectively connected to one terminal of a varactor diode tuning means, and in which the vertical portion of said first T-shaped microstrip member is coupled to said Balun input circuit, said first and second microstrip members being coupled together by a U-shaped microstrip member, and in which each of said varactor diode tuning means have their other terminals connected to said ground plane, thereby forming said microstrip varactor diode-tuned preselector circuit;

d. a varactor diode-tuned oscillator circuit having a third substantially T-shaped microstrip member, a varactor diode and an amplifying circuit, in which the horizontal portion of said third T-shaped microstrip member is positioned substantially parallel to said L-shaped microstrip member and has one end connected to said ground plane and the other end connected to one terminal of said varactor diode, and in which said amplifying circuit is coupled to the vertical portion of said third T-shaped microstrip member, thereby forming a varactor diode-tuned oscillator circuit;

e. a mixer circuit coupled to said preselector circuit and said oscillator circuit and having an L-shaped microstrip member and a mixer diode, one terminal of said mixer diode being connected to one end of said L-shaped microstrip member and the second terminal of said mixer diode being connected to said vertical portion of said second T-shaped microstrip member, thereby forming said mixer circuit; whereby f. said Balun circuit, said preselector circuit, said mixer circuit, and said oscillator circuit form said microstrip frequency converter.

2. A microstrip TV tuner, comprising in combination:

a. an insulating substrate having an electrically conductive layer selectively overlying and secured to a first major surface thereof to form a ground plane for said tuner;

b. a Balun input circuit comprising:

1. first and second spaced microstrip members overlying in non-intersecting relationship and secured to a second major surface of said substrate, said first microstrip member having one of its ends electrically connected to said ground plane;

2. a first ferrite member overlying and secured to said one major surface of said substrate below said first and second microstrip members; and 3. a second ferrite member overlying and secured to said second major surface of said substrate above said first and second microstrip members;

c. a varactor diode-tuned preselector circuit coupled to said Balun circuit comprising:

1. a third microstrip member overlying and secured to said second major surface of said substrate and having one end electrically connected to said ground plane, a central portion connected to said ground plane, a central portion connected to said second microstrip member, and a second end connected to a varactor diode tuning means, thereby forming a first tuned circuit;

2. a fourth microstrip member overlying and secured to said second major surface of said substrate and having a first end electrically connected to said ground plane and a second end connected to a varactor diode tuning means, thereby forming a second tuned circuit; and 3. a U-shaped microstrip member overlying and secured to said second major surface of said substrate and being positioned between and parallel to said third and fourth microstrip members, thereby coupling said first and second tuned circuits to form said varactor diode-tuned preselector circuit;

d. a varactor diode-tuned oscillator circuit comprising:

1. a fifth microstrip member overlying and secured to said second major surface of said substrate and having one end electrically connected to said ground plane, a second end connected to a varactor diode tuning means, and a central portion connected to amplifying means, thereby forming said varactor diode-tuned oscillator circuit;

e. a mixer circuit coupled to said preselector circuit and to said oscillator circuit, comprising:

1. an L-shaped microstrip member overlying and secured to said second major surface of said substrate and having one leg positioned substantially parallel to said fifth microstrip member, and a second leg connected to one terminal of a mixer diode; and 2. a sixth microstrip member overlying and connected to said second major surface of said substrate and having a first end connected to the central portion of said fourth microstrip member, a second end connected to the other terminal of said mixer diode, thereby forming said mixer circuit; and f. a low pass filter circuit coupled to said mixer circuit comprising:

1. first and second inductors each having one end connected in common, the other end of said first inductor coupled to the end of said one leg of said L-shaped microstrip and the other end of said second inductor coupled to an output terminal; and 2. a capacitor having one terminal coupled to said common terminal of said first and second inductors and a second terminal connected to said ground plane, thereby forming said low pass filter circuit; whereby g. said Balun circuit, preselector circuit, oscillator circuit, mixer circuit and filter circuit form said microstrip TV tuner.

3. The microstrip TV tuner of claim 2 wherein:

a. said amplifying means is a transistor having emitter, base and collector electrodes; and wherein 1. said collector electrode is coupled to an intermediate portion of said sixth microstrip member;

2. said base electrode is coupled to a reference potential through a parallel R-C circuit and to a bias voltage through a series resistive circuit, and 3. said emitter electrode is coupled to said bias voltage through a series L-R circuit and to said reference potential through a series L-C circuit.

4. A microstrip TV tuner in accordance with claim 2 wherein:

a. said first tuned circuit includes a varactor diode coupled to a tuning voltage source through a low pass filter comprising a first lead wire passing through a first ferrite bead; and wherein b. said second tuned circuit includes a varactor diode coupled to a tuning voltage source through a low pass filter comprising a second lead wire passing through a second ferrite bead; and wherein c. said oscillator circuit includes a varactor diode coupled to a tuning voltage source through a low pass filter comprising a third lead wire passing through a third ferrite bead.

5. A microstrip TV tuner in accordance with claim 2 wherein said amplifying means is connected to a voltage source through a low pass filter comprising a lead wire passing through a ferrite bead.

* * * * *